(12) United States Patent
Chen

(10) Patent No.: US 6,527,673 B1
(45) Date of Patent: Mar. 4, 2003

(54) STROLLER WITH A SENSOR AND A COUNTER

(76) Inventor: Chin-Chiao Chen, No. 1146, Chung-Shan Rd., Ta-Chia Chen, Taichung Hsien (TW)

( * ) Notice: Subject to any disclaimer, the term of this patent is extended or adjusted under 35 U.S.C. 154(b) by 0 days.

(21) Appl. No.: 09/992,834

(22) Filed: Nov. 16, 2001

(51) Int. Cl.[7] .................................................. A61H 3/00

(52) U.S. Cl. ................. 482/1; 482/5; 482/68; 135/67; 280/87.021

(58) Field of Search ............. 135/65–67, 71; 280/87.021; 482/1, 3–8, 66–68, 900–902

(56) References Cited

U.S. PATENT DOCUMENTS 5,311,880 A * 5/1994 Lancaster et al. ............. 482/68

* cited by examiner

Primary Examiner—Glenn E. Richman
(74) Attorney, Agent, or Firm—Brinks Hofer Gilson & Lione

(57) ABSTRACT

A stroller includes a stroller frame, a wheel unit mounted on the stroller frame, a resistance providing unit mounted on the stroller frame, a revolution sensor mounted on the stroller frame adjacent to the wheel unit so as to detect revolution of the wheel unit and so as to generate an electrical signal each time one revolution of the wheel unit is detected, and a counter mounted on the stroller frame and connected to the revolution sensor so as to receive the electrical signal from the revolution sensor and so as to count the number of the revolutions of the wheel unit.

3 Claims, 4 Drawing Sheets

STROLLER WITH A SENSOR AND A COUNTER

This invention relates to a stroller with a sensor and a counter for measuring the amount of exercise generated when pushing the stroller.

The object of the present invention is to provide a stroller with a sensor and a counter that is capable of measuring the amount of exercise generated when pushing the stroller, thereby attracting consumer interest in the use of strollers for performing exercise.

SUMMARY OF THE INVENTION

According to the present invention, a stroller comprises: a stroller frame; a wheel unit mounted on the stroller frame; a resistance providing unit mounted on the stroller frame and engageable with the wheel unit so as to provide resistance against rotation of the wheel unit when the stroller frame is pushed; a revolution sensor mounted on the stroller frame adjacent to the wheel unit so as to detect revolution of the wheel unit and so as to generate an electrical signal each time one revolution of the wheel unit is detected; and a counter mounted on the stroller frame and connected to the revolution sensor so as to receive the electrical signal from the revolution sensor and so as to count the number of the revolutions of the wheel unit.

BRIEF DESCRIPTION OF THE DRAWINGS

In drawings which illustrate an embodiment of the invention.

DETAILED DESCRIPTION OF THE PREFERRED EMBODIMENT

Figure 1:
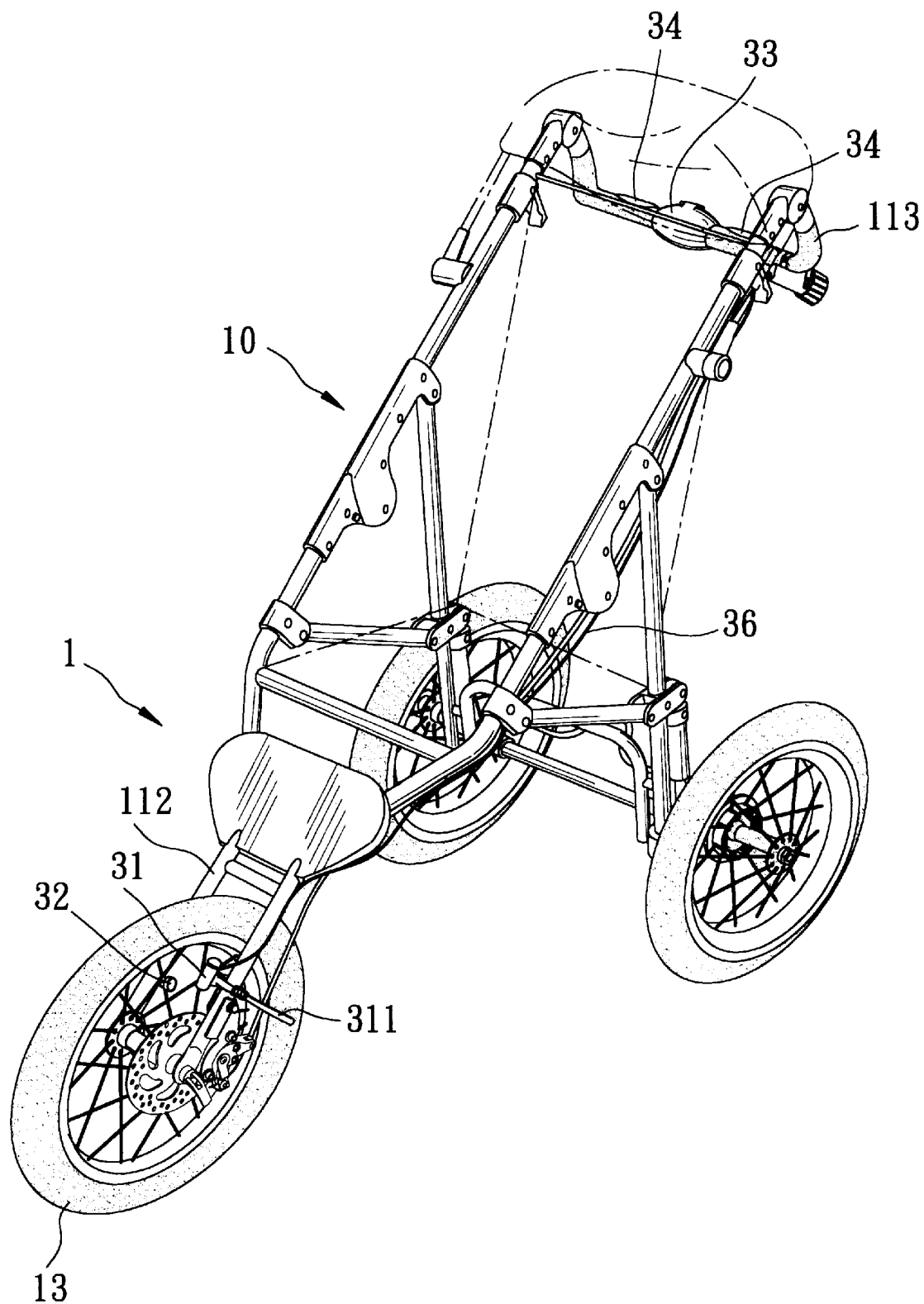
FIG. 1 is a perspective view of a stroller embodying this invention.
Figure 2:
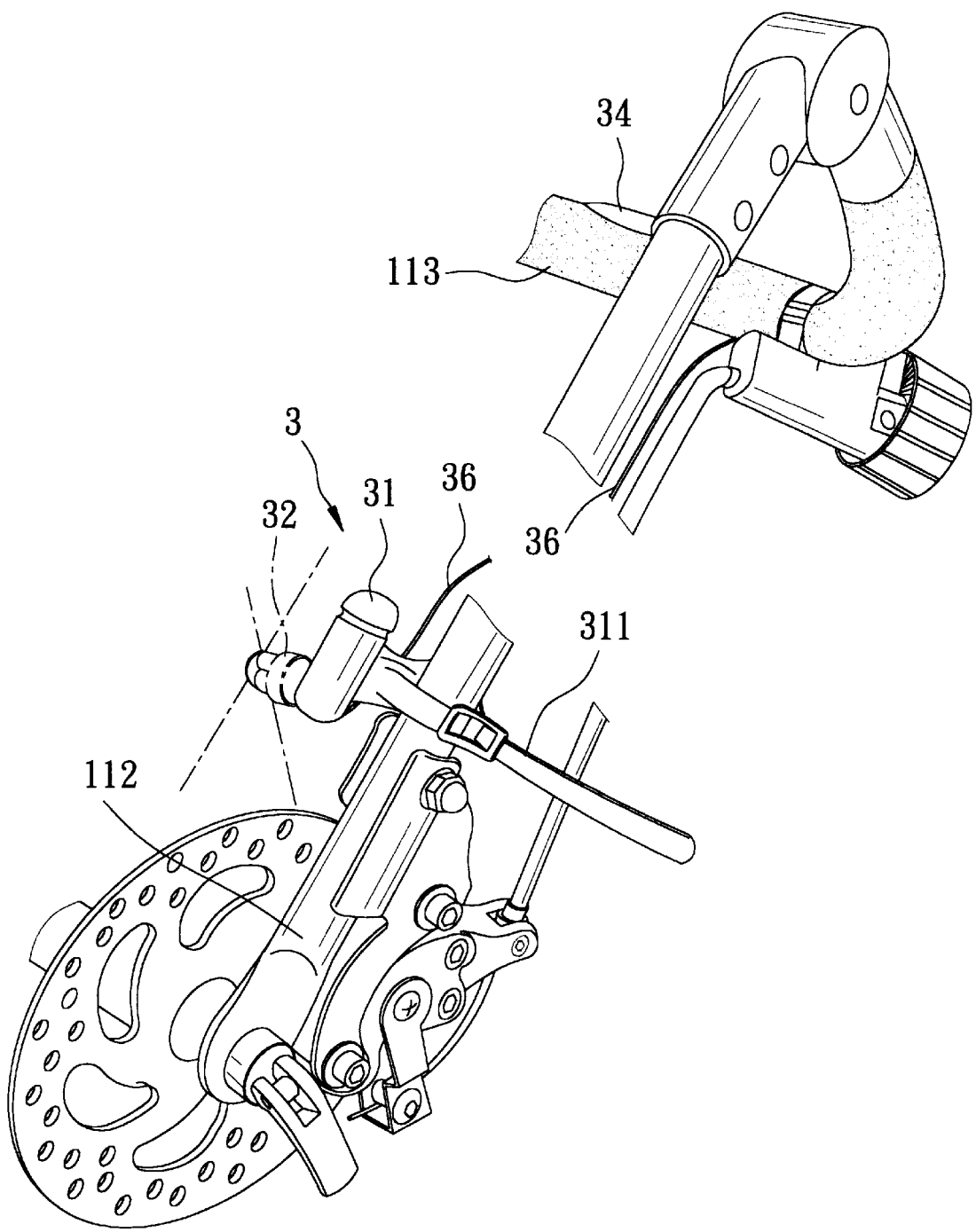
FIG. 2 is a fragmentary perspective view to illustrate how a revolution sensor is mounted on a front wheel of the stroller of FIG. 1.
Figure 3:
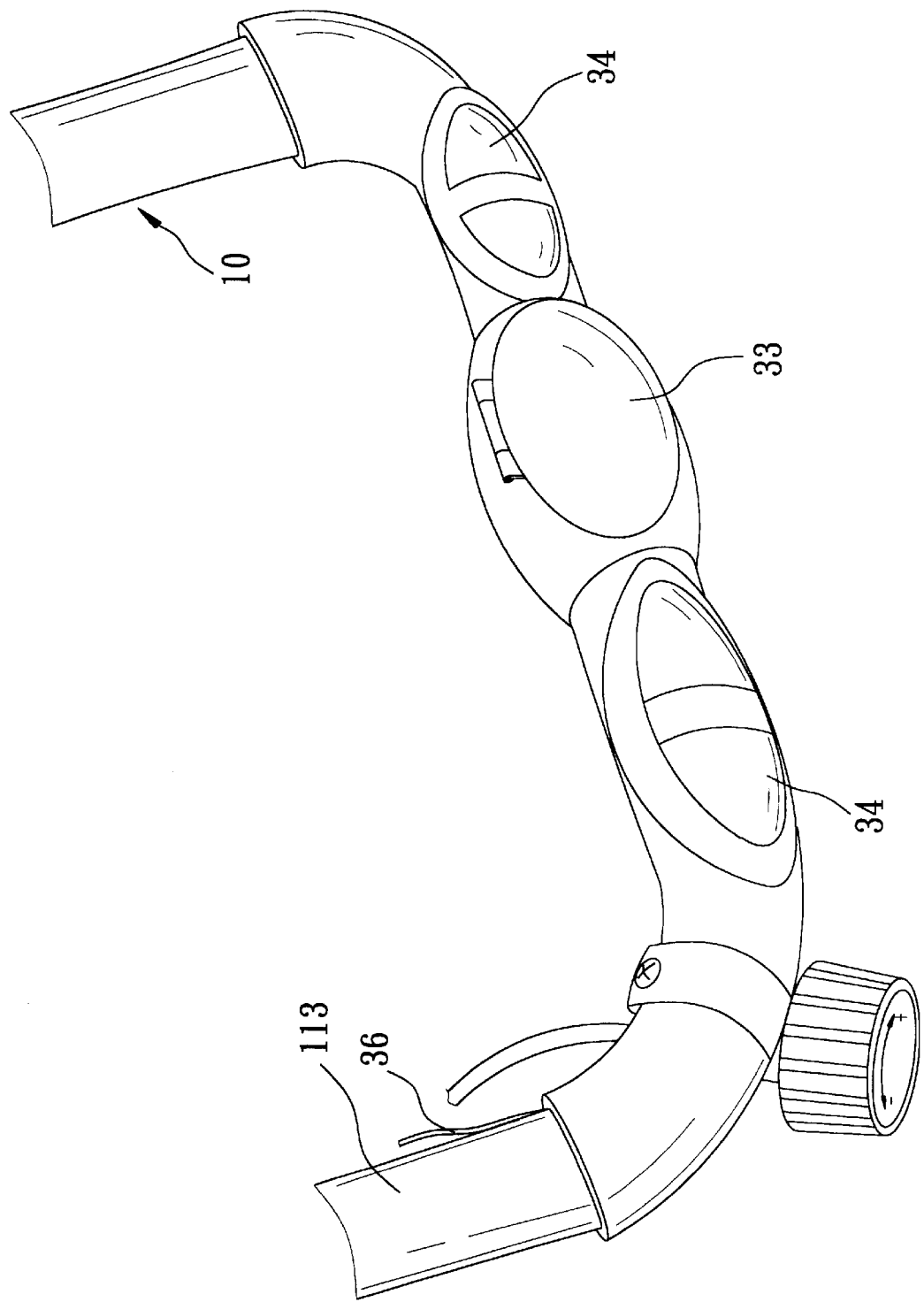
FIG. 3 is a fragmentary perspective view to illustrate how a pair of heat beat sensors are mounted on a grip of the stroller of FIG. 1.

FIGS. 1 to 3 illustrate a preferred embodiment of a stroller 1 that includes: a stroller frame 10; a wheel unit mounted on the stroller frame 10; a resistance providing unit mounted on the stroller frame 10 and engageable with the wheel unit so as to provide resistance against rotation of the wheel unit when the stroller frame 10 is pushed; a revolution sensor 3 mounted on the stroller frame 10 adjacent to the wheel unit so as to detect revolution of the wheel unit and so as to generate a first electrical signal each time one revolution of the wheel unit is detected; and a counter 33 mounted on the stroller frame 10 and connected to the revolution sensor 3 via a conductive wire 36 so as to receive the first electrical signal from the revolution sensor 3 and so as to count the number of the revolutions of the wheel unit during use of the stroller 1.

An example of the resistance providing unit is disclosed in Applicant's co-pending application, entitled Stroller With A Resistance Providing Unit, the entire disclosure of which is incorporated herein by reference.

The wheel unit includes a front wheel 13. The stroller frame 10 includes a grip 113 and a pair of opposing front legs 112 defining a wheel receiving space therebetween that receives the front wheel 13. The revolution sensor 3 includes a magnetic member 32 attached securely to one spoke of the front wheel 13 so as to be turnable therewith, and a magnetic detector 31 mounted securely on one of the front legs 112 via a fastener 311 and projecting into the wheel receiving space so as to be capable of detecting the magnetic member 32 and generating the first electrical signal when the magnetic member 32 passes proximate to the magnetic detector 31.

The stroller 1 further includes a pair of opposing heart beat sensors 34 mounted on the grip 113 and adapted to be respectively griped by left and right hands of the user, and a pulse detector 332 connected to the heart beat sensors 34 (see FIG. 4) so as to detect heart beat of the user from the heart beat sensors 34 and so as to generate a second electrical signal corresponding to the heart beat of the user. The counter 33 is connected to the pulse detector 332 so as to receive the second electrical signal from the pulse detector 332 and so as to count the number of the heart beats of the user during use of the stroller 1.

Figure 4:
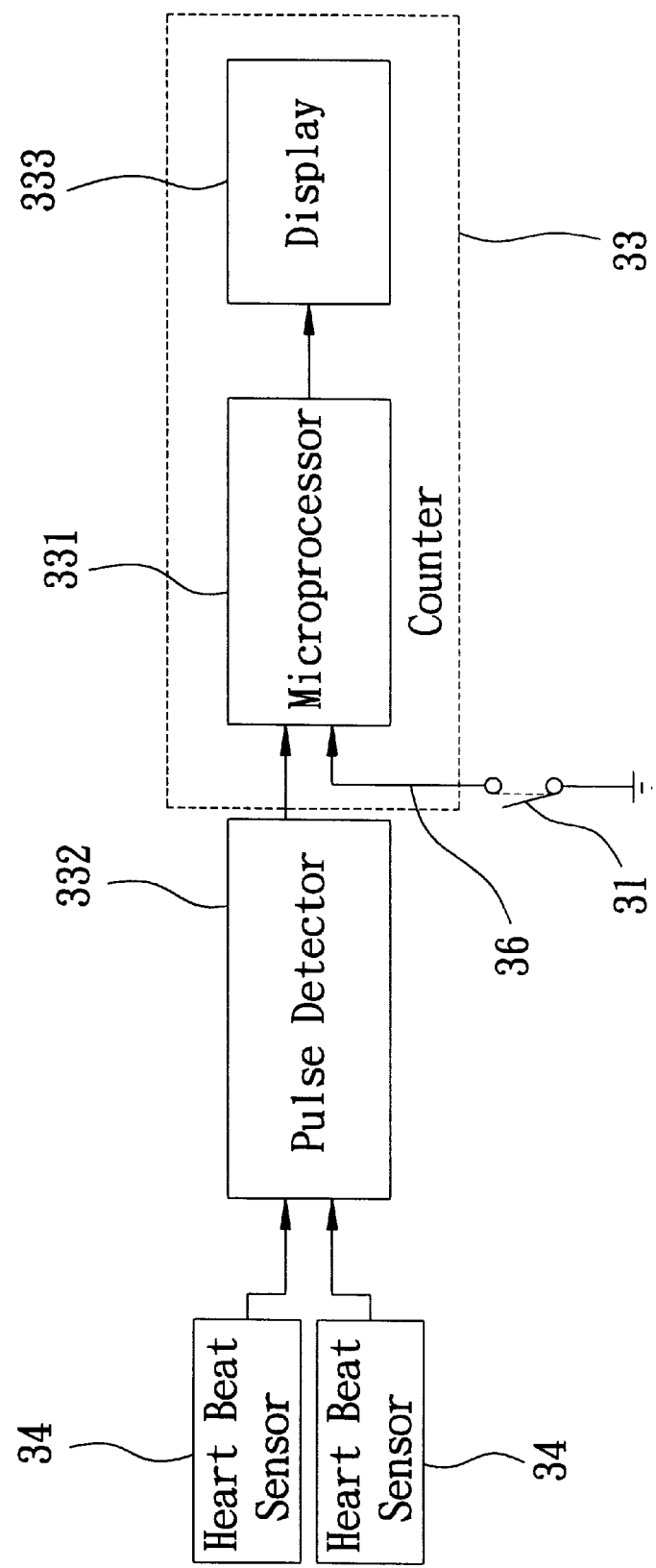
FIG. 4 is a schematic circuit block diagram to illustrate how a counter is connected to the revolution sensor and the heart beat sensors.

Referring to FIG. 4, in combination with FIGS. 2 and 3, the counter 33 includes a microprocessor 331 that receives and processes the second electrical signal from the pulse detector 332 and the first electrical signal from the magnetic sensor 31 so as to calculate the number of the heart beats of the user and the number of revolutions of the front wheel 13 and so as to calculate the amount of exercise in terms of calories consumed during the use of the stroller 1. The counter 33 further includes a display 333 that is connected to and controlled by the microprocessor 331 so as to show the amount of exercise thereon.

With the invention thus explained, it is apparent that various modifications and variations can be made without departing from the spirit of the present invention. It is therefore intended that the invention be limited only as recited in the appended claims.

I claim:

1. A stroller comprising:

a stroller frame;

a wheel unit mounted on said stroller frame;

a resistance providing unit mounted on said stroller frame and engageable with said wheel unit so as to provide resistance against rotation of said wheel unit when said stroller frame is pushed;

a revolution sensor mounted on said stroller frame adjacent to said wheel unit so as to detect revolution of said wheel unit and so as to generate a first electrical signal each time one revolution of said wheel unit is detected; and a counter mounted on said stroller frame and connected to said revolution sensor so as to receive the first electrical signal from said revolution sensor and so as to count the number of the revolutions of said wheel unit.

2. The stroller of claim 1, wherein said wheel unit includes a front wheel, said stroller frame including a pair of opposing front legs defining a wheel receiving space therebetween that receives said front wheel, said revolution sensor including a magnetic member attached securely to said front wheel so as to be turnable therewith, and a magnetic detector mounted on one of said front legs and projecting into said wheel receiving space so as to be capable of detecting said magnetic member and generating the first electrical signal when said magnetic member passes proximate to said magnetic detector.

3. The stroller of claim 1, wherein said stroller frame further includes a grip, said counter being mounted on said grip and including a microprocessor and a display connected to and controlled by said microprocessor, said stroller further comprising a pair of opposing heart beat sensors mounted on said grip and adapted to be respectively in contact with left and right hands of the user, and a pulse detector that is connected to said heart beat sensors so as to detect heart beat of the user and so as to generate a second electrical signal corresponding to the heart beat of the user, said microprocessor being connected to said magnetic detector and said pulse detector so as to receive the first and second electrical signals from said magnetic detector and said pulse detector and so as to count the number of the revolutions of said wheel unit and the number of the heart beats of the user which are subsequently shown on said display.

* * * * *